(12) United States Patent
Chiu (10) Patent No.: US 7,125,116 B1
(45) Date of Patent: Oct. 24, 2006

(54) EYEGLASSES ATTACHABLE TO CAP

(76) Inventor: Lien-Fa Chiu, 3F-2, No. 99, Puzaicuo, Budai Township, Chiayi County (TW)

( * ) Notice: Subject to any disclaimer, the term of this patent is extended or adjusted under 35 U.S.C. 154(b) by 0 days.

(21) Appl. No.: 11/420,065

(22) Filed: May 24, 2006

(51) Int. Cl.
*G02C 3/00* (2006.01)
(52) U.S. Cl. .............................. 351/155; 351/158; 2/10
(58) Field of Classification Search ................ 351/155, 351/158, 41; 2/10, 11, 12, 13
See application file for complete search history.

(56) References Cited

U.S. PATENT DOCUMENTS

| | | | | |
|---|---|---|---|---|
| 4,869,586 A | * | 9/1989 | Chung | 351/158 |
| 5,347,655 A | * | 9/1994 | Garrett | 2/10 |
| 5,422,686 A | * | 6/1995 | Kelman et al. | 351/155 |
| 5,692,234 A | * | 12/1997 | Yuen | 2/10 |
| 5,778,448 A | * | 7/1998 | Maher | 2/10 |
| 6,662,371 B1 | * | 12/2003 | Shin | 2/10 |

* cited by examiner

*Primary Examiner*—Hung Xuan Dang
(74) *Attorney, Agent, or Firm*—Banger Shia (57) ABSTRACT

A pair of eyeglasses includes a lens, two engaging blocks each having an end engaged with a side of the lens, and two clamping members. A ring is mounted to the other end of each engaging block. An end of each clamping member is mounted to a cap visor. The other end of each clamping member includes an engaging hole. An annular toothed wall extends from a bottom wall defining the engaging hole. An annular groove is defined between an outer face of the annular toothed wall and an inner circumference defining the engaging hole. The rings are engaged in the engaging holes the clamping members, with teeth on the annular toothed wall engaged with teeth on the ring. The annular toothed wall expands into the annular groove when the teeth of the rings press against the teeth of the annular toothed wall during pivotal movement of the rings.

4 Claims, 8 Drawing Sheets

EYEGLASSES ATTACHABLE TO CAP

BACKGROUND OF THE INVENTION

1. Field of the Invention

The present invention relates to a pair of eyeglasses. More particularly, the present invention relates to a pair of eyeglasses that can be attached to a visor of a cap.

2. Description of the Related Art

Eyeglasses and hats are often used for shielding from the sun when going out. Eyeglasses and hats are separate and thus must be carried separately. It is very inconvenient for a use wearing a pair of corrective eyeglasses to carry a pair of sunglasses.

Eyeglasses attachable to a visor of a cap have been proposed. A pair of eyeglasses of this type can be moved between an operative position for shielding from the sun and an inoperative position for clear vision.

Figure 7:
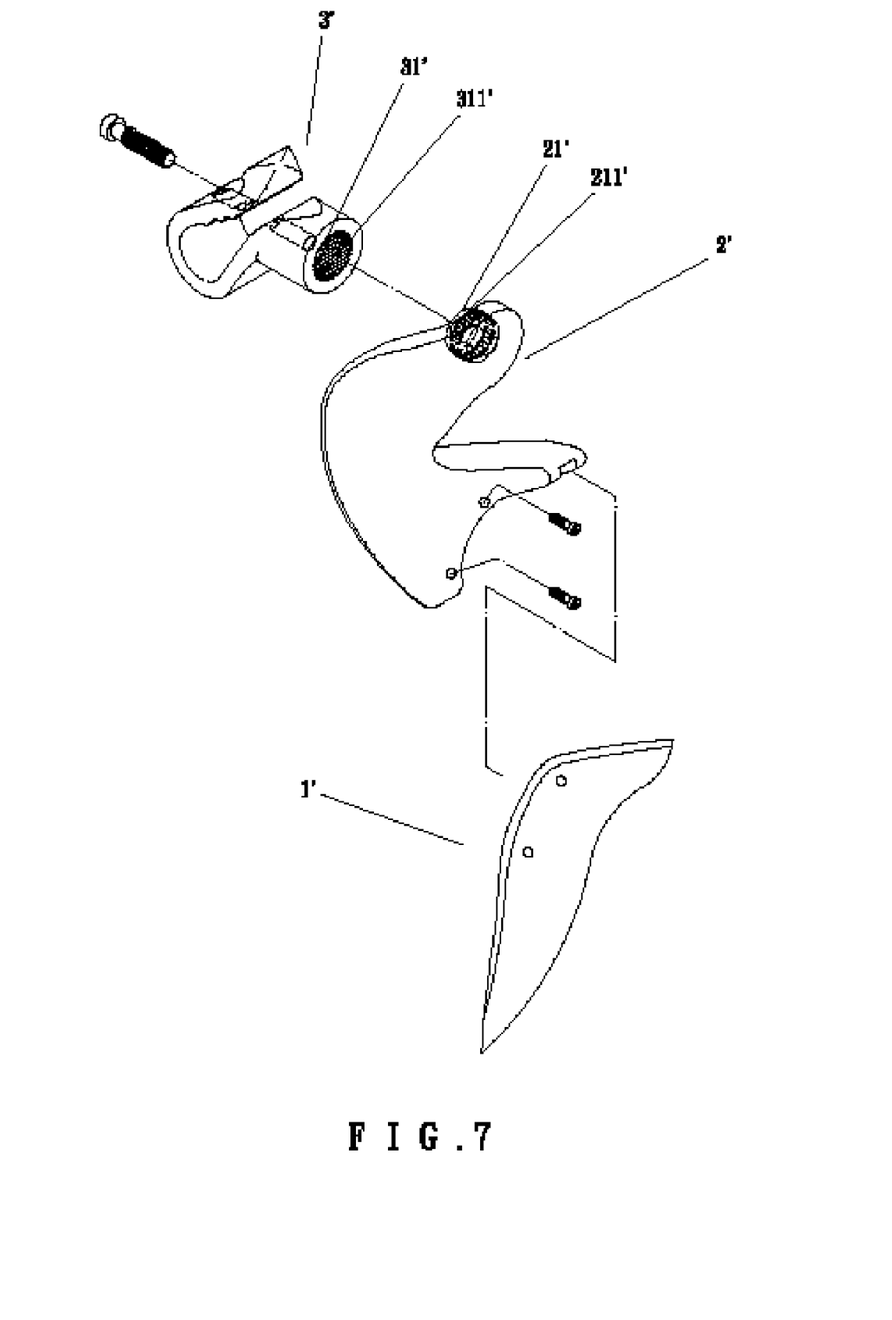
FIG. 7 is an exploded perspective view of a portion of a pair of conventional eyeglasses attachable to a cap.
Figure 8:
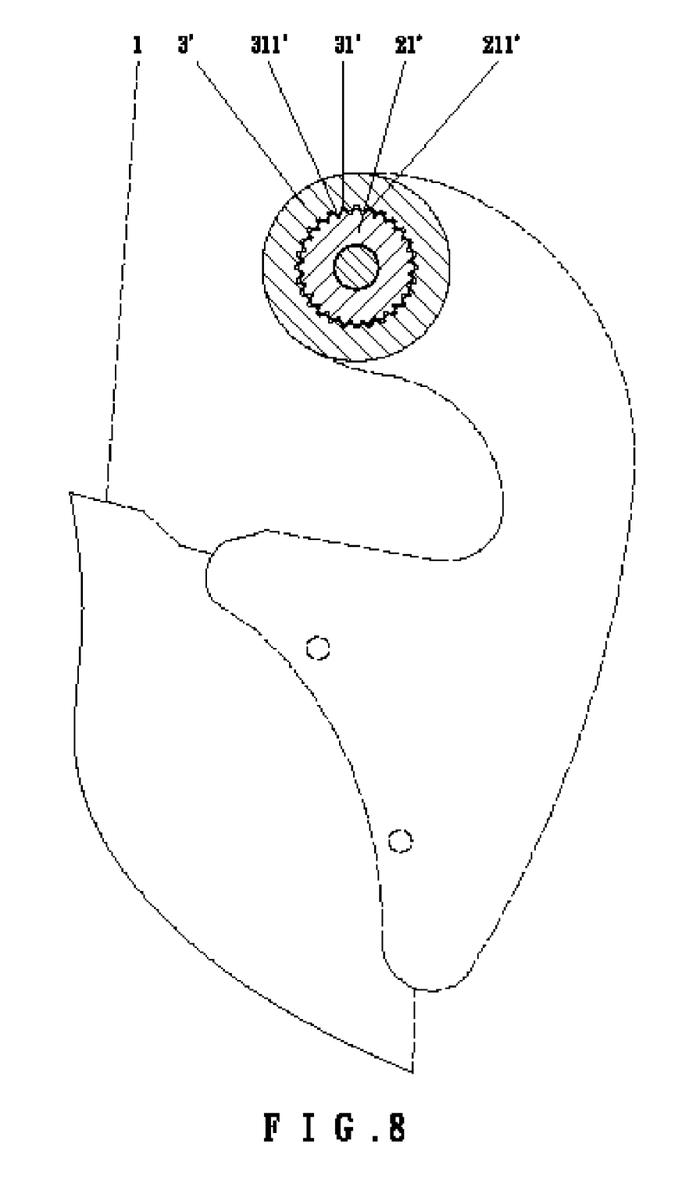
FIG. 8 is a sectional view of the pair of conventional eyeglasses in FIG. 7.

FIGS. 7 and 8 of the drawings illustrate a pair of conventional eyeglasses attachable to a visor of a cap. The pair of eyeglasses includes a lens 1', two engaging blocks 2' (only one is shown) respectively on two sides of the lens 1', and two clamping members 3' (only one is shown). Each engaging block 2' includes an end securely engaged with an associated side of the lens 1'. The other end of each engaging block 2' includes a protrusion 21' with a plurality of teeth 211' on a circumference thereof. Each clamping member 3' includes a first end that can be clamped to a side of a visor (not shown) of a cap (not shown). Each clamping member 3' further includes a second end that has an engaging hole 31' for receiving the protrusion 21' of an associated engaging block 2'. A plurality of teeth 311' are defined in an inner circumference defining the engaging hole 31' and engage with the teeth 211' of the protrusion 21'. The engaging block 2' can be pivoted relative to the clamping member 3' and then retained in place.

However, expansion of the circumferential wall defining the engaging hole 31' is not easy such that a large force is required to turn the engaging block 2', which is inconvenient to adjustment of the angular position of the lens 1'. Further, the teeth 211' and 311' wear out easily, leading to unreliable positioning of the engaging block 2' relative to the clamping member 3'.

SUMMARY OF THE INVENTION

A pair of eyeglasses in accordance with the present invention comprises a lens, two engaging blocks, and two clamping members. Each engaging block includes a first end securely engaged with an associated one of two sides of the lens. Each engaging block further includes a second end with an engaging section. A ring is securely mounted to the engaging section of each engaging block and includes a plurality of teeth on an outer circumference thereof.

Each clamping member includes a first end adapted to be mounted to a side of a visor of a cap. Each clamping member further includes a second end having an engaging section. The engaging section of each clamping member includes an engaging hole. An annular toothed wall extends from a bottom wall defining the engaging hole. The annular toothed wall includes a plurality of teeth on an inner face thereof. An annular groove is defined between an outer face of the annular toothed wall and an inner circumference defining the engaging hole.

Each ring is engaged in the engaging hole of an associated clamping member, with the teeth of the annular toothed wall engaged with the teeth of the ring. When the rings are pivoted relative to the clamping members, the annular toothed wall expands into the annular groove when the teeth of the rings press against the teeth of the annular toothed wall during pivotal movement of the rings. After pivoting, the teeth of the rings are firmly engaged with the teeth of the annular toothed wall due to resilient returning force from the annular toothed wall.

Preferably, the engaging section of each engaging block includes a protrusion around which the ring is securely mounted.

Preferably, the engaging section of each engaging block includes a through-hole. A receptacle is defined in the bottom wall defining the engaging hole of each clamping member. A fastener extends through the through-hole into the receptacle, allowing each engaging block to pivot relative to an associated one of the clamping members.

Preferably, the toothed wall includes a plurality of annularly spaced toothed wall sections.

Other objectives, advantages, and novel features of the invention will become more apparent from the following detailed description when taken in conjunction with the accompanying drawings.

DETAILED DESCRIPTION OF THE PREFERRED EMBODIMENT

Figure 1:
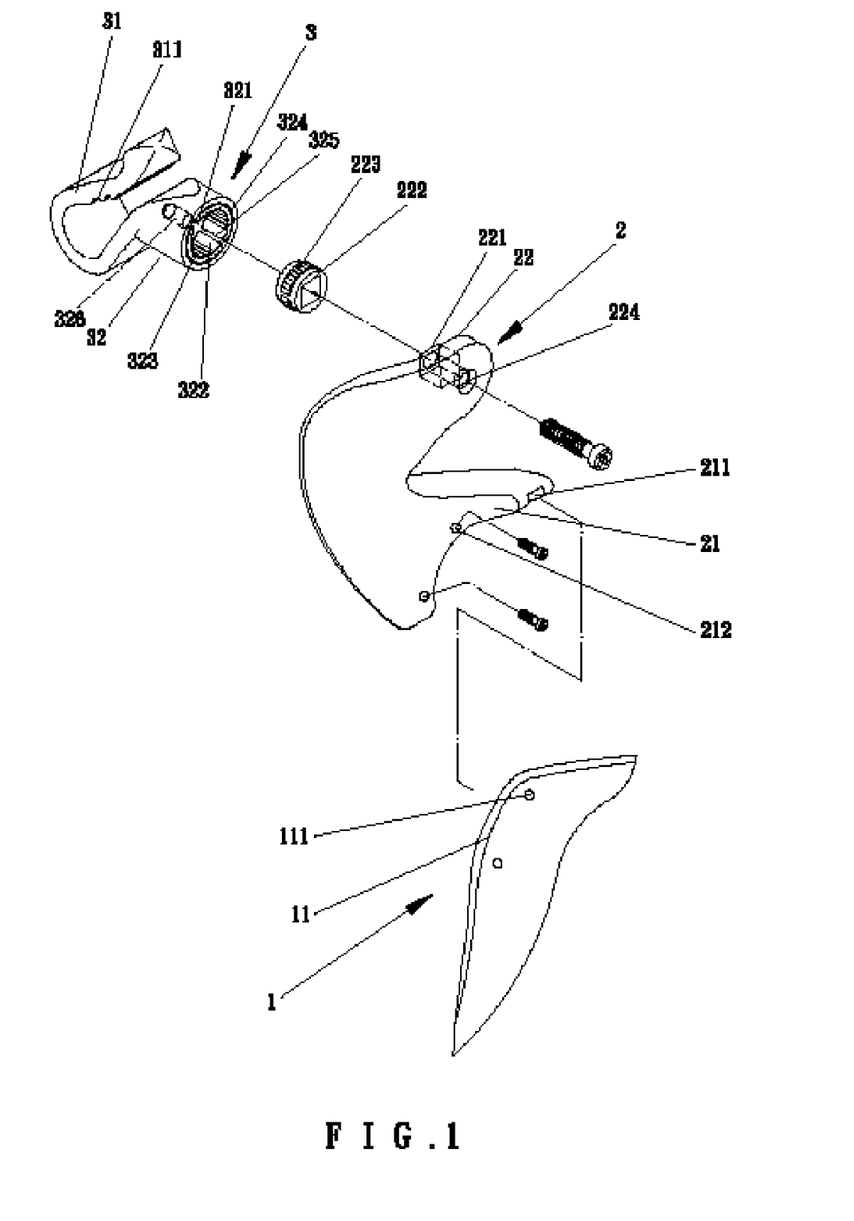
FIG. 1 is an exploded perspective view of a portion of a pair of eyeglasses in accordance with the present invention.
Figure 2:
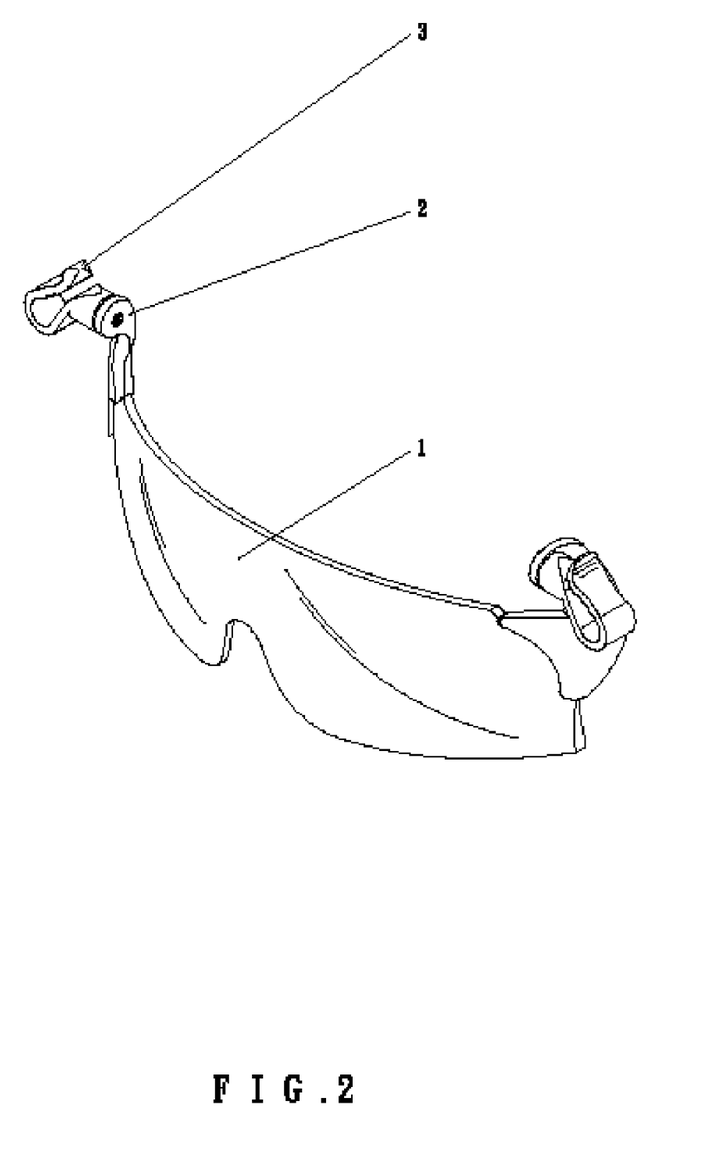
FIG. 2 is a perspective view of the pair of eyeglasses in accordance with the present invention.
Figure 3:
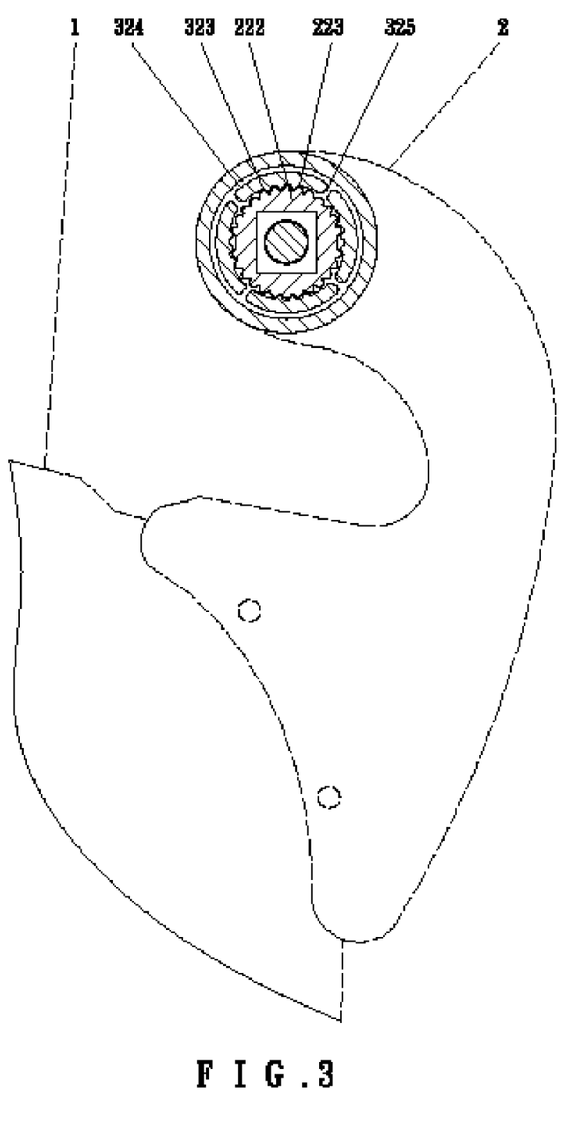
FIG. 3 is a sectional view of the pair of eyeglasses in accordance with the present invention.

Referring to FIGS. 1 through 3, a pair of eyeglasses in accordance with the present invention comprises a lens 1, two engaging blocks 2 respectively on two sides of the lens 1, and two clamping members 3. Each side of the lens 1 includes a coupling section 11 and two fixing holes 111.

Each engaging block 2 includes a first end having an engaging groove 211 for engaging with the coupling section 11 of an associated side of the lens 1. The first end of each engaging block 2 further includes two fixing holes 212. Fasteners (not labeled) are extended through the fixing holes 111 of the lens 1 and the fixing holes 212 of each engaging block 2. Thus, each engaging block 2 is securely engaged with an associated side of the lens 1.

A second end of each engaging block 2 includes an engaging section 22 for engaging an associated clamping member 3. In this example, the engaging section 22 includes a protrusion 221 with a through-hole 224. A ring 222 is securely mounted around the protrusion 221 and includes a plurality of teeth 223 on an outer circumference thereof. In this example, the protrusion 221 is square in section, and the ring 222 includes a square hole (not labeled) for receiving the protrusion 221.

Figure 6:
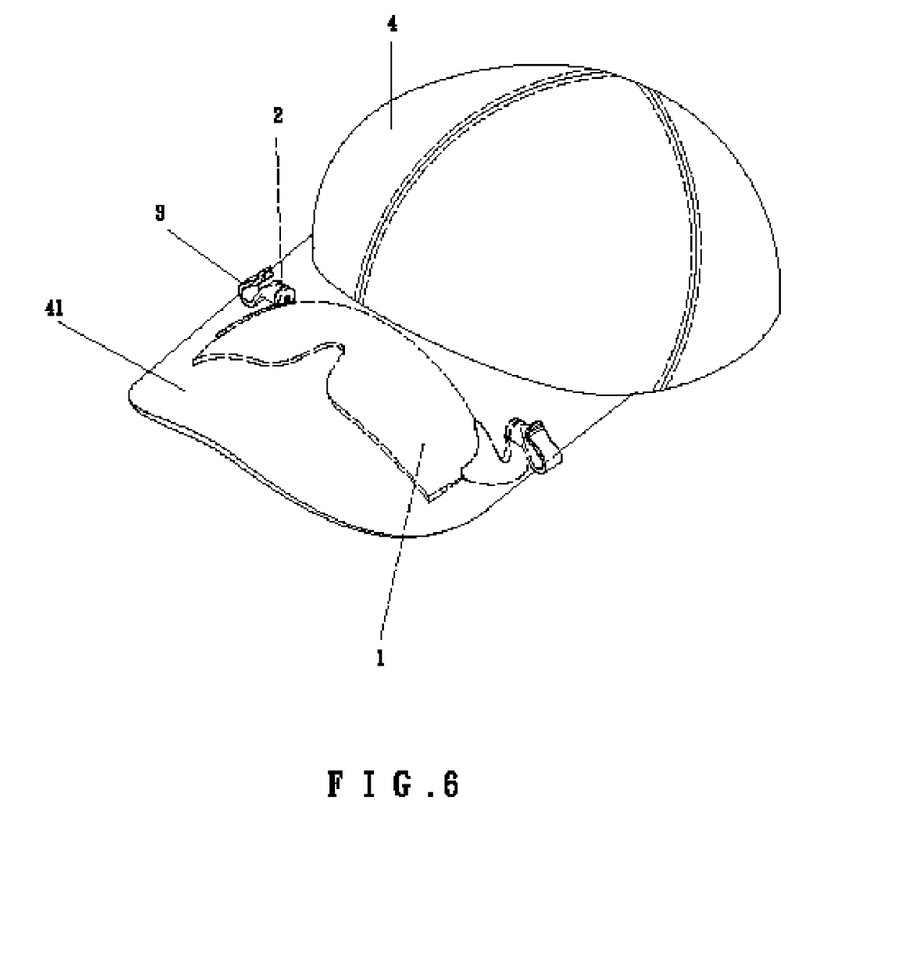
FIG. 6 is a view similar to FIG. 5, wherein the lens of the eyeglasses is in an inoperative position.

Each clamping member 3 includes a first end with a clip 31 for clamping to a side of a visor 41 of a cap 4 (see FIG. 6). Preferably, the clip 31 includes teeth 311 of an inner face thereof to enhance the clipping effect. Each clamping member 3 further includes a second end that has an engaging section 32 for engaging with the associated engaging block 2.

In this example, the engaging section 32 of each clamping member 3 includes an engaging hole 321 for receiving an associated the ring 222. An annular wall extends from a bottom wall defining the engaging hole 321 of each clamping member 32. In this example, the annular wall includes a plurality of toothed wall sections 322 annularly spaced from one another by a spacing 325. Each toothed wall section 322 includes a plurality of teeth 323 on an inner face thereof for engaging with the teeth 223 of the ring 222. Further, an annular groove 324 is defined between outer faces of the toothed wall sections 322 and an inner circumference defining the engaging hole 321.

When each ring 222 is received in the engaging hole 321 of an associated clamping member 3, the teeth 223 of the ring 222 are engaged with the teeth 323 of the toothed wall sections 322, as shown in FIG. 3. A fastener (not labeled) is extended through the through-hole 224 of the engaging block 2 into a receptacle 326 in the bottom wall defining the engaging hole 321 of the associated clamping member 3, allowing the engaging block 2 to pivot relative to the associated clamping member 3.

Figure 5:
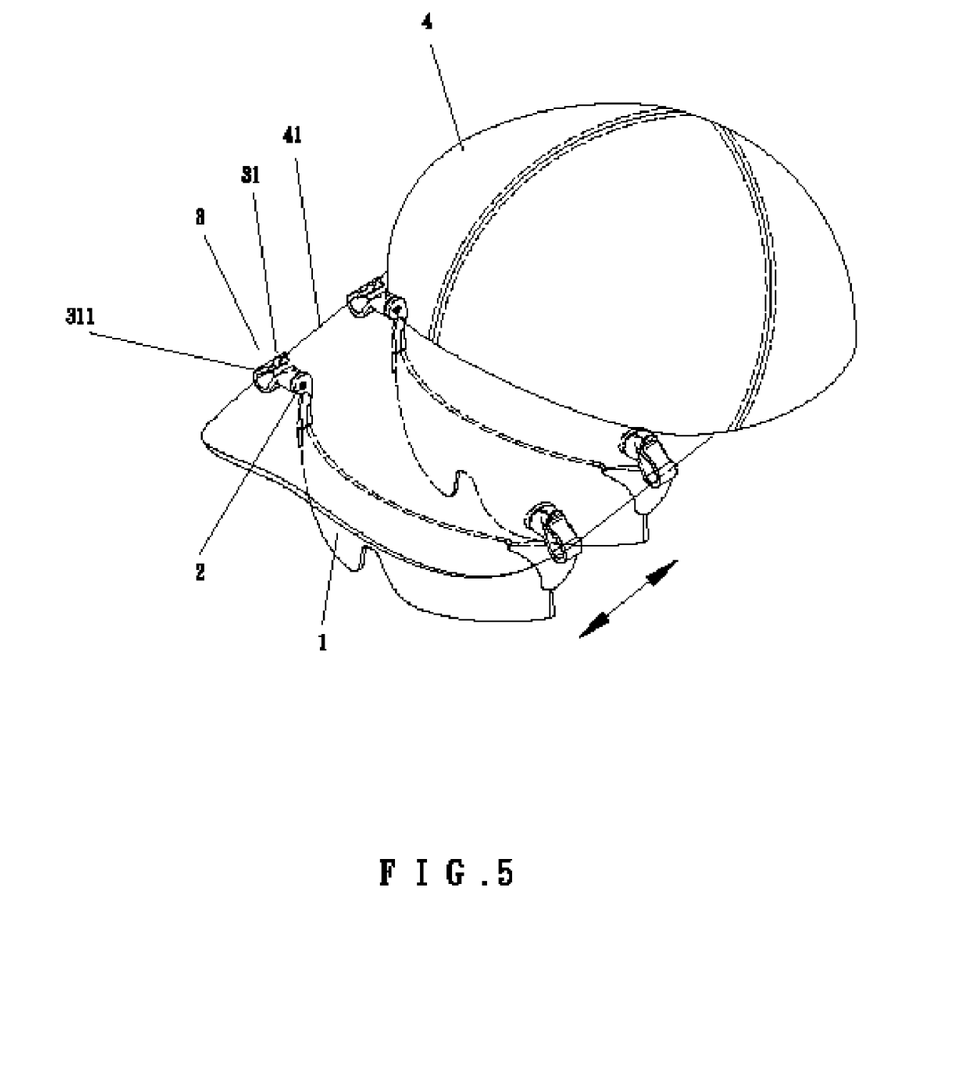
FIG. 5 is a perspective view illustrating use of the pair of eyeglasses on a visor of a cap.

Referring to FIG. 5, the pair of eyeglasses in accordance with the present invention can be attached to a visor 41 of a cap 4 in a desired location by clipping the clips 31 of the clamping members 3 to two sides of the visor 41.

Figure 4:
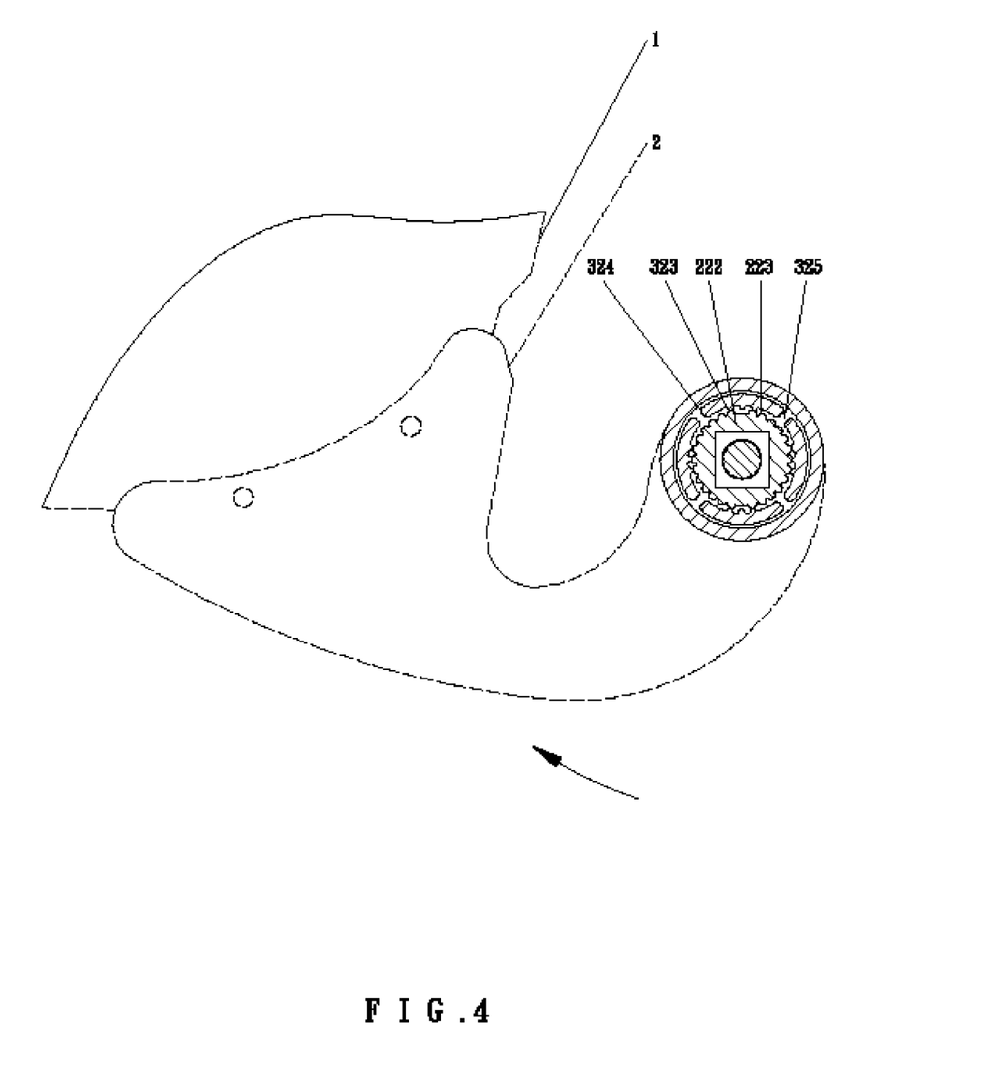
FIG. 4 is a sectional view similar to FIG. 3, illustrating pivotal movement of an engaging block.

Referring to FIG. 4, the engaging blocks 2 can be pivoted relative to the clamping members 3 and then retained in place. The toothed wall sections 322 expand radially outward into the annular groove 324 between the toothed wall sections 322 and the inner circumference defining the engaging hole 321 when the teeth 222 of the rings 222 press against the teeth 323 of the toothed wall sections 322 during the pivotal movement of the engaging blocks 2. After pivoting, the teeth 222 of the rings 22 are firmly engaged with the teeth 323 of the toothed walls 322 due to resilient returning force from the toothed wall sections 322 (see FIG. 3). The engaging blocks 2 are thus reliably positioned. Thus, the lens 1 can be pivoted between an operative position (see FIG. 5) for shielding from the sun and an inoperative position (see FIG. 6) for clear vision.

The ring 222 can be integrally formed with the protrusion 221.

Although a specific embodiment has been illustrated and described, numerous modifications and variations are still possible without departing from the essence of the invention. The scope of the invention is limited by the accompanying claims.

What is claimed is:

1. A pair of eyeglasses attachable to a cap, the pair of eyeglasses comprising:

a lens having two sides;

two engaging blocks each including a first end securely engaged with an associated one of the sides of the lens, each said engaging block further including a second end with an engaging section, a ring being securely mounted to the engaging section of each said engaging block and including a plurality of teeth on an outer circumference thereof; and two clamping members each including a first end adapted to be mounted to a side of a visor of a cap, each said clamping member further including a second end having an engaging section, the engaging section of each said clamping member including an engaging hole, an annular toothed wall extending from a bottom wall defining the engaging hole, the annular toothed wall including a plurality of teeth on an inner face thereof, an annular groove being defined between an outer face of the annular toothed wall and an inner circumference defining the engaging hole;

each said ring being engaged in the engaging hole of an associated one of the clamping members, with the teeth of the annular toothed wall engaged with the teeth of said ring;

wherein when said rings are pivoted relative to the clamping members, the annular toothed wall expands into the annular groove when the teeth of the rings press against the teeth of the annular toothed wall during pivotal movement of the rings; and wherein after pivoting, the teeth of the rings are firmly engaged with the teeth of the annular toothed wall due to resilient returning force from the annular toothed wall.

2. The pair of eyeglasses as claimed in claim 1 wherein the engaging section of each said engaging block includes a protrusion around which said ring is securely mounted.

3. The pair of eyeglasses as claimed in claim 1 wherein the engaging section of each said engaging block includes a through-hole, a receptacle being defined in the bottom wall defining the engaging hole of each said clamping member, further including a fastener extending through the through-hole into the receptacle, allowing each said engaging block to pivot relative to an associated one of the clamping members.

4. The pair of eyeglasses as claimed in claim 1 wherein the annular toothed wall includes a plurality of annularly spaced toothed wall sections.

* * * * *